United States Patent [19]
Lodder et al.

[11] Patent Number: 5,150,928
[45] Date of Patent: Sep. 29, 1992

[54] COUPLING SLEEVE FOR CONNECTION OF A BRANCH PIPE TO A MAIN PIPE

[75] Inventors: Bernhard Lodder, Hardenberg; Berend J. van Dijk, Slagharen; Adriaan Paulen, Zwolle; Albertus A. Oostenbrink, Hardenberg, all of Netherlands

[73] Assignee: Wavin B.V., Netherlands

[21] Appl. No.: 460,321

[22] PCT Filed: Jun. 20, 1988

[86] PCT No.: PCT/NL88/00030
§ 371 Date: Dec. 21, 1989
§ 102(e) Date: Dec. 21, 1989

[87] PCT Pub. No.: WO88/10392
PCT Pub. Date: Dec. 29, 1988

[30] Foreign Application Priority Data

Jun. 23, 1987 [NL] Netherlands .................. 8701464
Mar. 1, 1988 [NL] Netherlands .................. 8800527

[51] Int. Cl.⁵ ............................................. F16L 41/00
[52] U.S. Cl. ................................. 285/205; 285/196
[58] Field of Search ............... 285/162, 196, 205, 222

[56] References Cited

U.S. PATENT DOCUMENTS

| | | | |
|---|---|---|---|
| 591,431 | 10/1897 | Smith | 285/205 X |
| 803,687 | 11/1905 | Grotewohl | 285/205 |
| 810,431 | 1/1906 | Pfluger et al. | 285/222 X |
| 812,625 | 2/1906 | Weston | 285/222 X |
| 1,018,354 | 2/1912 | Fairfield | 285/205 X |
| 1,274,988 | 8/1918 | Chadwick | 285/205 |
| 1,870,274 | 8/1932 | Wulfert et al. | 285/205 X |
| 2,441,009 | 5/1948 | Cunningham | 285/205 X |
| 2,991,943 | 7/1961 | Mullett et al. | 285/192 X |
| 3,034,521 | 5/1962 | Greenfield | 285/192 X |
| 4,492,392 | 1/1985 | Woods et al. | 285/205 X |

Primary Examiner—Dave W. Arola
Assistant Examiner—Carol I. Bordas

[57] ABSTRACT

The connecting end on a coupling sleeve has an annular flange which may be hoved to urge compression stress to an annular deformable sealing ring to establish a seal between the main pipe and coupling sleeve. A stop part flange is positioned to one side of a sealing couple and which may assume a fixed position relative to the wall of the main pipe against which the stop part rests. Pivoted link stretching elements on the coupling sleeve move the insertion end of the branch pipe outwards relative to the wall of the main pipe and provides structure for exerting a compression stress against the resilient sealing ring to effect a seal between the coupling and main pipe. After securing the coupling sleeve in a sealing couple the connecting end and the insertion end assume a fixed predetermined position relative to the main pipe with use of stretching means which comprises at least two identical lever elements which are positioned at equal spacings about the periphery of the coupling sleeve and which are each capable of setting a predetermined fixed distance between fixed points connected to the outside periphery of the insertion end and the stop part.

6 Claims, 6 Drawing Sheets

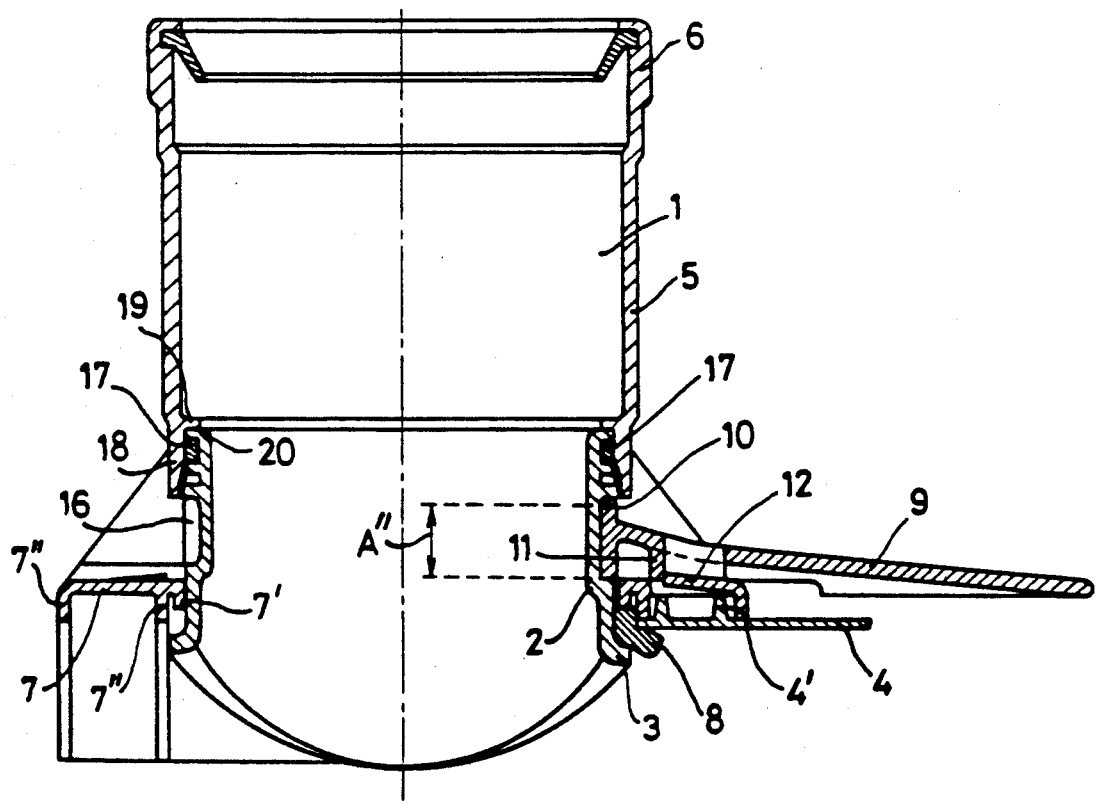
FIG: 4a.

COUPLING SLEEVE FOR CONNECTION OF A BRANCH PIPE TO A MAIN PIPE

The invention relates to a coupling sleeve for connection of a branch pipe to a main pipe, comprising at least:
an insertion end with an outwardly flanged edge which can be allowed through by an opening in such main pipe in which said insertion end is to be accommodated,
a connecting end;
an annular sealing means of resilient material which is disposed round the insertion end and rests against the flanged edge, and which can deform through the exertion of compression stress for fixing the insertion end in sealing fashion in the opening in such main pipe
a stop part which is provided above the sealing means and has a stop for said sealing means, and which can assume a fixed position relative to the external surface of said main pipe during and after the fixing in sealing fashion of the insertion end in the opening in said main pipe;
stretching means for moving the insertion end outwards relative to the wall of said main pipe, for exerting compression stress on said resilient sealing means while they are confined between the flanged edge of the insertion end and the stop of the stop part.

Such a coupling sleeve is known from Applicants' Dutch Patent Application 7605427.

Such a known coupling sleeve comprises a stop part in the form of a sliding part disposed round the insertion end.

Such a coupling sleeve is fixed in an opening formed in the surface of the main pipe by tightening a stretching screw which on one side rests against the sliding part of the sleeve and on the other turns in the screw thread disposed on the outside of the sleeve. Tightening the stretching screw causes the insertion end to be moved outwards, so that the sealing means consisting of resilient material are compressed and increase so much in size that a good seal of the insertion end in the main pipe is achieved.

Such a known coupling sleeve has the disadvantage that the seal achieved depends on the extent of tightening of the stretching screw, and said seal can therefore vary from case to case and from person to person carrying out the tightening. Besides, there can be a risk of damage and/or leaking if the stretching screw is tightened too much.

An object of the present invention is to provide a solution to the above problem, in that after fixing the coupling sleeve in a sealing fashion the connecting end and the insertion each assumes a predetermined position relative to the outside wall of the main pipe, and the stretching means comprises at least two identical stretching elements which are provided at equal spaced intervals on the periphery of the coupling sleeve and each is capable of setting a predetermined fixed distance between fixed points connected to the outside periphery of the insertion end and the stop part so that a predetermined fixed compression of the sealing material is achieved.

With a coupling sleeve according to the present invention the same end position of the insertion end and the connecting end relative to the pipe wall is always achieved, while in addition a fixed compression of the sealing means, for example an elastomer sealing means, is always achieved. Damage and/or leakage, such as that which was possible with too great tightening in the above-described known coupling sleeve, are no longer possible.

In their most simplified form, the stretching elements comprise, for example, stretching bars resting with one end against a fixed point connected to the external surface of the insertion end, and resting with the other end on a fixed point relative to the periphery of the main pipe after fitting in the end position; the latter point will be on the top surface of the stop part which can assume a fixed position relative to the main pipe.

In particular, the coupling socket according to the invention is designed so that the connecting end and the insertion end of the branch pipe are separated parts and the connecting end and stop part in the direction of the connecting end may mate with the non-moving connecting end in sealing fashion with the use of a suitable sealant.

In this embodiment the stop part rests against the outside of the main pipe during and after fixing of the coupling sleeve. Since the connecting end and the stop part are fixed to each other, when the insertion part is moved by means of a stretching element outwards relative to the stop part, and thus relative to the outside wall of the pipe, an excellent seal is achieved between the insertion end and the pipe wall through the sealing means increases in size as a result of the compression. Through the outward movement of the insertion end relative to the connecting end which is in a fixed position, an excellent seal is also achieved between the connecting end and the insertion end, using a suitable sealing means.

Another advantageous embodiment of the coupling sleeve according to the invention is that the connecting end (5) and the insertion end (2) of the coupling sleeve are connected to each other to form one unit and the stop part (7) is a sliding part which is present around the insertion end (2) and can rest on the outside surface of the main pipe (4).

The connecting end and the insertion end of the coupling sleeve are connected to form one unit; the stop part is a sliding part which assumes a fixed position relative to the outside surface of the main pipe. Through outward sliding of the insertion end by means of a stretching element disposed between the insertion end and the stop part, an excellent seal is also achieved between the insertion end and the edges of the opening in the main pipe, with the aid of the sealing means used.

A stretching element to be used expediently comprises a lever arrangement in which the common levers are capable of moving the insertion end of the branch pipe from an initial position to a fixed end position, while the maximum stroke of each of the levers is at least equal to the minimum compression of the resilient material of the sealing means which is required for sealing action. In the coupling sleeve according to the invention each of the levers pivots about a point which is fixed relative to the insertion end or to the stop part, and these levers in their end position are essentially perpendicualr to or parallel to the wall of the insertion end.

Securing means are expediently provided for securing each of the levers in their final locked end positions.

The stop part, comprising at least one stop against which the sealing means can rest when the connection is being formed, is very advantageously in the form of a plate adapted to conform to the outside surface of the main pipe.

If the main pipe is one with cross ribs on the outside, the plate used can be unprofiled, but it can also be provided with cross ribs which extend towards the wall of the main pipe, which are staggered relative to the cross ribs of the pipe when the coupling sleeve is in position, the length of the cross ribs of the plate are equal to the height of the cross ribs of a main pipe with which the coupling sleeve is to be used.

Through these embodiments of the stop part, a coupling sleeve according to the invention can be used for either smooth pipes or for pipes with cross ribs.

For certain embodiments of the stop part, in particular if it is in the form of a sliding plate which is used in conjunction having a pipe with cross ribs, the plate is provided with a collar which extends along the insertion end of the coupling sleeve in the direction of the flanged edge thereof, and the length of which is essentially equal to the height of the cross ribs. Such a collar is advantageous, when the coupling sleeve is being fixed, for preventing the flexible material of the sealing means from bulging out in the recess between the pipe surface and the plate resting on the top of the ribs, in a direction parallel to the main pipe, and thus giving rise to the risk of leaks.

The invention also relates to a pipe provided with a coupling sleeve for attaching a branch pipe, such a pipe being characterized in that a coupling sleeve of the type described herein above according to the invention is used.

The invention will now be explained with reference to the drawing, in which:

FIG. 4a–4c shows a sectional side view, a side view and a top view respectively of a coupling sleeve according to yet another embodiment.

Figure 1:
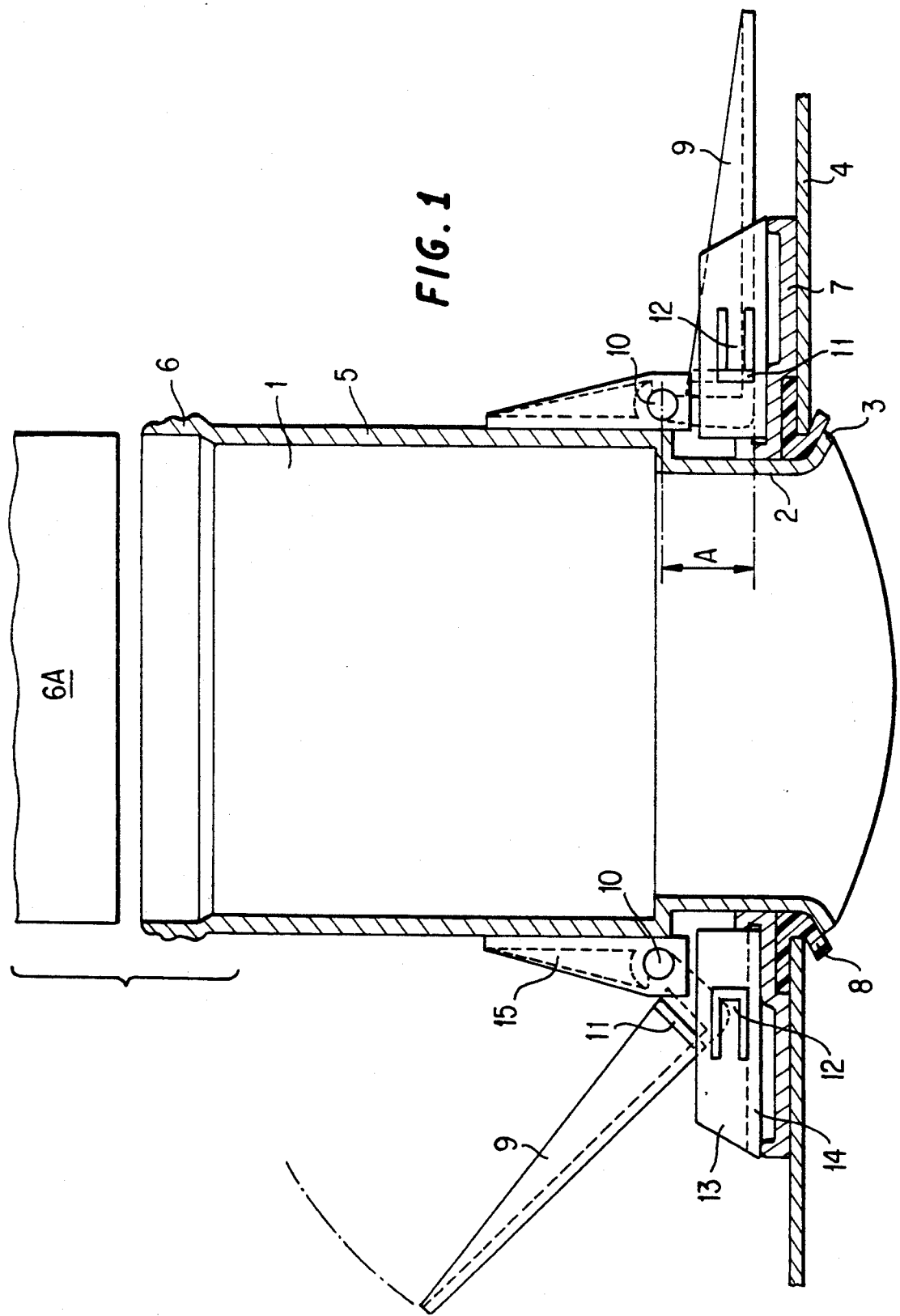
FIG. 1 is a cross section of a coupling sleeve according to the invention, in a first embodiment.

In FIG. 1 a coupling sleeve according to the invention, which is made of a plastic such as polyvinyl chloride, is indicated by reference number 1, while the insertion end of the sleeve provided with an outwardly flanged edge is indicated at 2. In this figure the insertion end of the sleeve is shown as having smaller diameter than the connecting end of the sleeve. Such a narrowing is, of course, not necessary. The coupling sleeve can have the same diameter over its entire length, with the exception of the flanged edge and possibly the connecting means at the other end.

It is not necessary to provide the connecting end with connecting means; the connecting end may, if desired, comprise a length of pipe which connects directly to a device or the like to which it is to be connected to the main pipe.

In the present FIG. 1, the connecting end 5 is connected to form one unit with the insertion end 2, the connecting end 5 being provided with fastening means 6 for fastening it to a branch pipe 6A. These fastening means for a branch pipe are generally known and will not be described further.

The stop part is indicated at 7 and is designed here as a flange plate adapted axially slide over to the main pipe; the plate flange rests at one side on the main pipe 4 and on the other side on the sealing means 8 of resilient material. Of course, the stop part can be designed in another way; all that is required is means for a peripheral compression of the sealing means 8 and a supporting face at the side of each of the stretching means used.

The periphery of the coupling sleeve has at least two levers which can pivot about pivot points 10; in the end or fully seated position of the levers 9 they are essentially parallel to the main pipe 4, and a fixed distance A is formed between the centre of the pivot point 10 and a lever resting face 14 which has a fixed position relative to the stop part 7 and thus to the main pipe 4. The pivot point 10 is on a pivot point support 15 fixed to the sleeve 5. In the embodiment shown in FIG. 1 securing means are present in the form of a protuberance 11 on the lever and an inwardly curved lip 12 in the side walls 13 extending upwards on either side of the lever resting face 14.

When the lever 9 has reached the end position the protuberance 11 falls behind the inwardly curved lip 12, and the lever 9 cannot be released without further ado. The lever is shown in the end position on the righthand side of FIG. 1; the position of the protuberance 11 and the inwardly curved lip 12 relative to each other can be seen there.

Figure 2:
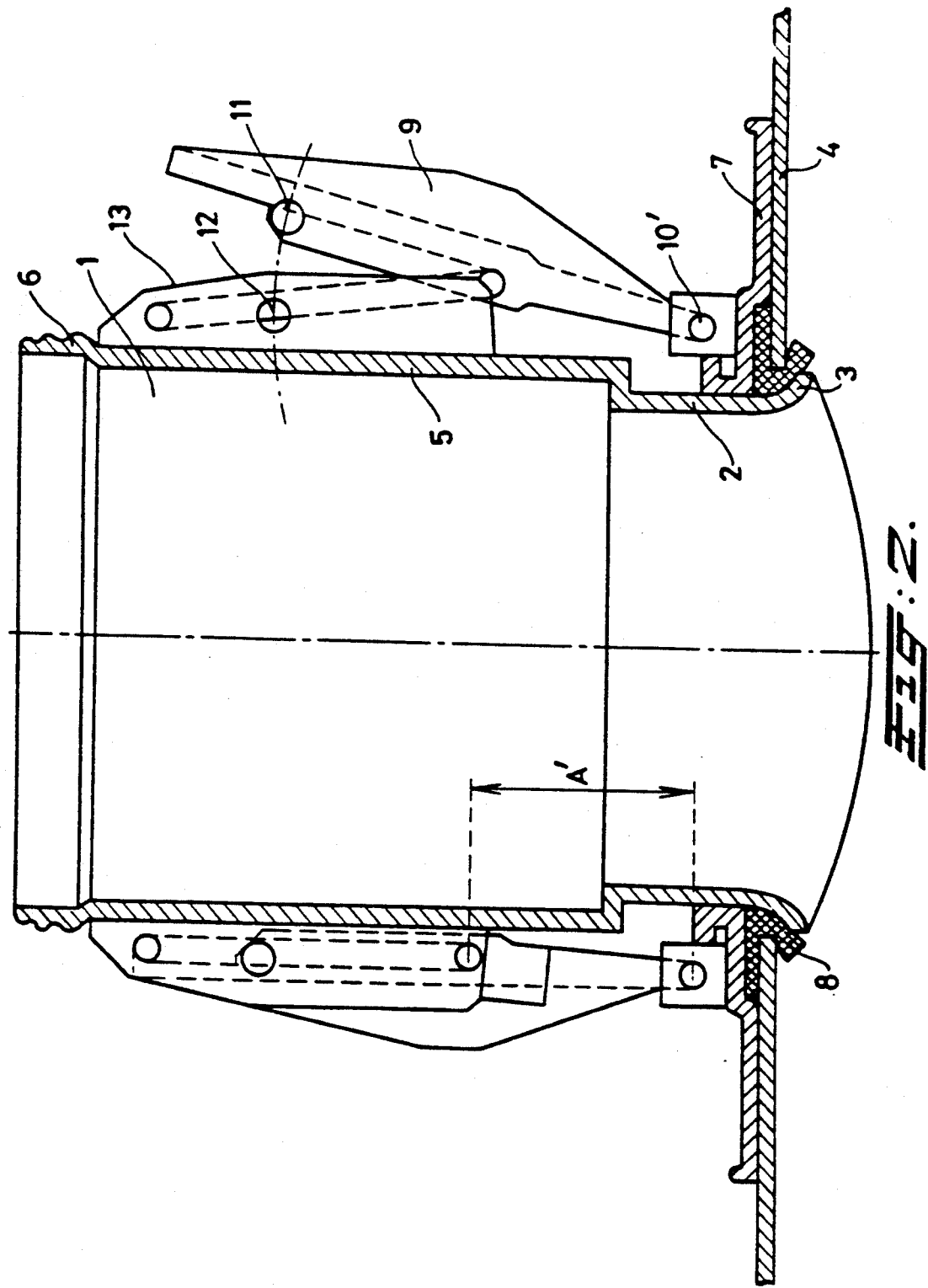
FIG. 2 shows a cross section of a coupling sleeve according to the invention, in another embodiment.

In FIG. 2 the parts with the same function as those in FIG. 1 are indicated by the same reference numbers. Securing is achieved here through the fact that the securing means 11 and 12 are formed by holes present in the lever 9 and the side walls 13, through which a securing pin can be inserted.

In FIGS. 1 and 2 discussed above two levers are shown on either side of the coupling sleeve; it will be clear that several levers can also be used if they are uniformly distributed about the periphery of the insertion end.

Figure 3:
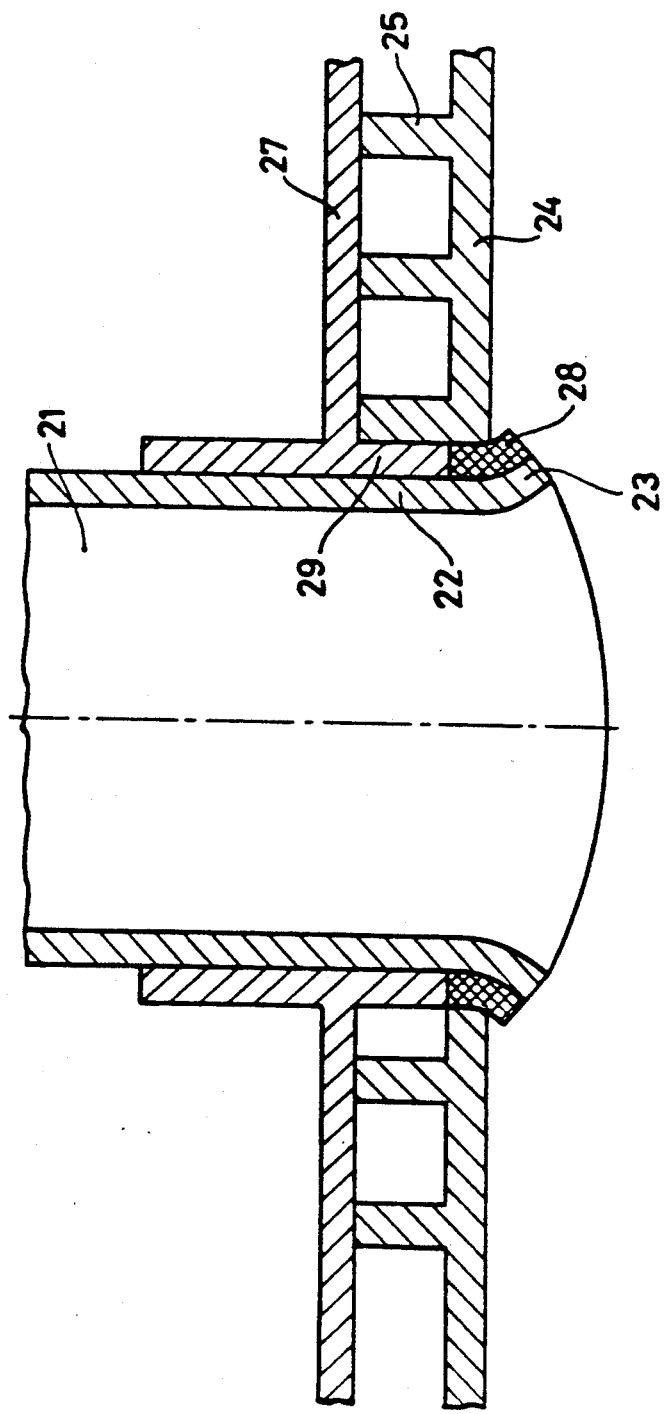
FIG. 3 shows a cross section of the insertion end of a coupling sleeve according to the invention, in which it is used in a plastic pipe provided with transverse ribs.

FIG. 3 shows an insertion end 22 of a coupling sleeve 21 according to the invention which is adapted for use having a ribbed pipe 24 with cross ribs 25. The insertion end 22 has a flanged edge 23 in this case, while a sealing means 28 is present for forming the seal. The part of the sliding part lying against the main pipe is designed in the form of a plate and, on account of the presence of the cross ribs, has a collar 29 which projects in the direction of the surface of the main pipe lying between the ribs and extends over a length which is essentially equal to the height of the cross ribs.

This means that, when the levers described above and not shown here are being operated, bulging of the resilient material 28 is prevented from occurring in any unfilled recess there may be between the ribs, as seen on the lefthand side of FIG. 3. Excellent sealing is achieved by completely confining the sealing material.

Figure 4B:
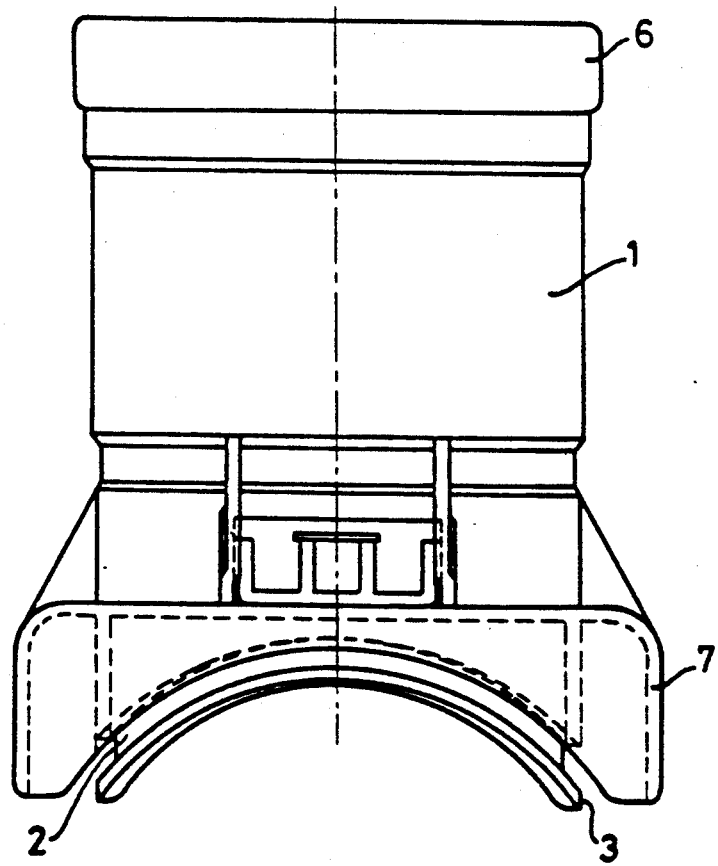
Figure 4C:
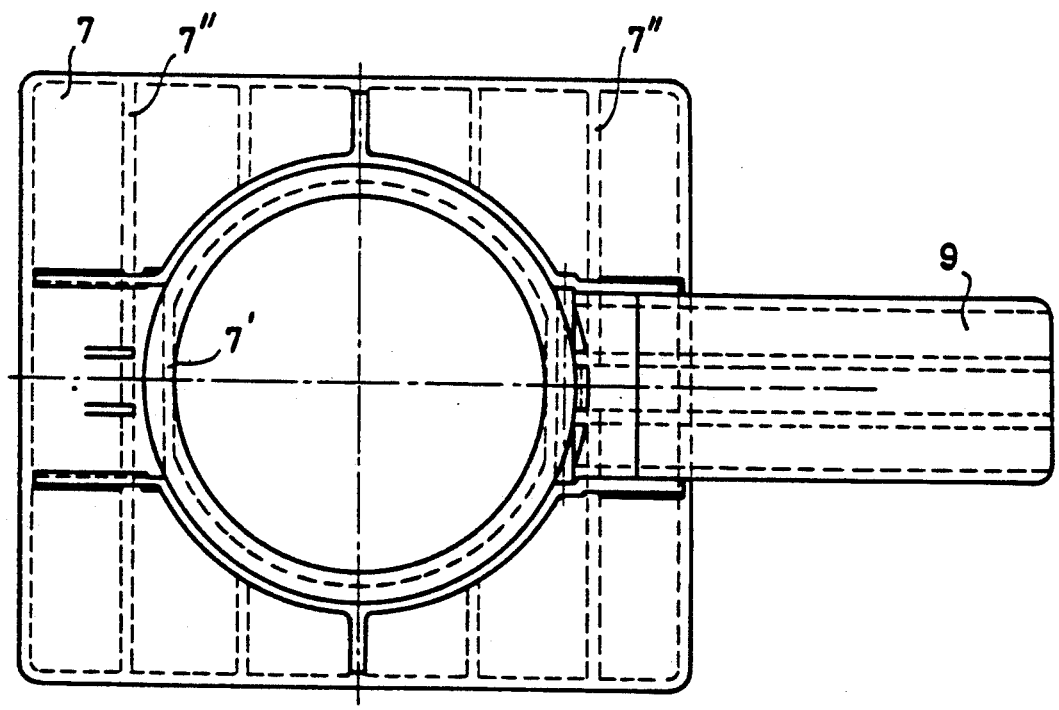

FIGS. 4a–c shows another embodiment of a coupling sleeve according to the invention, which differs slightly from the embodiments described above. In this figure the same reference numbers are again used for the parts having the same functions as in FIGS. 1 and 2.

FIG. 4a shows a coupling sleeve 1, in this case comprising two separate parts 2 and 5. The insertion end 2 has a flanged collar 3, against which a sealing means 8 can rest for sealing between the insertion end 2 and the wall of the main pipe 4.

The connecting end is shown here provided with connecting means 6; of course, these connecting means can also be left out, and the connecting end 5 can be connected directly to a device or the like for connection to the main pipe 4.

The stop part 7 in this embodiment is fixed to the connecting part 5; the stop part 7 comprises a stop 7', against which the sealing means 8 can rest, and it also has cross ribs 7" which are of the same height as the ribs 4' of the main pipe 4, which is thus in this case a pipe with cross ribs.

The stop part 7 rests against the cross ribs 4' prior to the fitting of the coupling sleeve, so that the connecting part connected to the stop part also assumes a fixed position relative to the main pipe 4.

The sealing means 8 are confined between the flanged edge 3 and the stop 7'.

Operating the levers 9 (the lever 9 on the lefthand side is left out for the sake of clarity) which rotates about pivot points 10 causes the insertion end 2 to move out of the main pipe, so that the sealing means 8 is compressed and increase in size. Through this expansion, a good seal is achieved between the insertion end 2 and the wall of the main pipe 4. The connecting end 5 does not change its position relative to the main pipe during this fastening; sliding the insertion end 2 outwards produces a mating between the top end 20 of the insertion end and the bottom side 18 of the connecting end, while mating with a sealing means 17. Through the presence of a stop 19, a fixed end position of the connecting end 5 and the insertion end 2 is achieved when the coupling sleeve 1 is fully fitted, and there is also a fixed compression of the sealing means 17.

It is pointed out also that the stop 19 is not necessary and may be omitted. Equally good working of the sleeve can also be obtained if the top end 20 remains free from the stop 19, since the positioning of the insertion end relative to the connecting end depends solely on the working and dimensioning of the levers 9.

The lever 9 with the part under the pivot point 10 is accommodated in a recess 16 which is shown on the lefthand side of the figure.

Securing means 11 and 12 are also present in this case to prevent the levers 9 fron being released without further ado when the coupling sleeve is fitted.

FIGS. 4b and 4c show the two-part coupling sleeve according to FIG. 4a in yet another side view and in a top view, which further clarifies the position of the various parts.

In connection with the coupling sleeve according to the invention, it is also pointed out that it is indicated in the above description for use when connecting a branch pipe to a main pipe. Of course, a coupling sleeve according to the invention may also be used for connecting a branch pipe to, say, the flat wall of a tank, but in that case the stop part must be of a flat shape which is adapted to said wall.

The material of the coupling sleeve according to the invention is preferably a plastic such as polyvinyl chloride; other materials commonly used for the production of pipes may also be used. The sealing means used may also be in many different forms, and generally comprise a resilient elastomer material such as synthetic or natural rubber, silicone material etc.

We claim:

1. A coupling sleeve for connection of a branch pipe to a main pipe comprising: said coupling sleeve having a connecting end and an insertion end with a radially outwardly flanged edge which is inserted into an opening in said main pipe, an annular sealing means of resilient material for sealingly engaging said coupling sleeve and said main pipe disposed around the insertion end and resting against the flanged edge which can deform through the exertion of compressive stress occurring when fixing the insertion end in sealing fashion in the opening in said main pipe, a stop part positioned on the side of said opening opposite said flanged edge and defining a recess with said main pipe wall for receiving said sealing means and wherein said stop part rests against the external surface of said main pipe, stretching elements for moving said outwardly flanged edge in a direction outward relative to the wall of said main pipe and for exerting said compressive stress on said resilient sealing means while said resilient sealing means are confined between the flanged edge of the insertion end and said recess and wherein the stretching means comprises at least two identical lever stretching elements which are provided at equal spaced intervals about the periphery of the coupling sleeve.

2. A coupling sleeve as claimed in claim 1 characterized in that the connecting end and the insertion end of said coupling sleeve are separate parts and the connecting end and the stop part are fixed to each other so that when the insertion end is moved outwards relative to the stop part in the direction of the connecting end it can mate with the non-moving connecting end in sealing fashion with use of a second sealing means.

3. A coupling sleeve as claimed in claim 1 wherein the connecting end and the insertion end of the coupling sleeve are connected to each other to form one unit and the stop part is a sliding flange plate which is present around the insertion end and rests on the outside surface of the main pipe.

4. A coupling sleeve as claimed in any of the preceding claims characterized in that said stretching elements comprises at least a pair of common levers which are capable of sliding the insertion end of said coupling sleeve from an initial position to a fixed end position thereby exerting said compressive stress on said resilient sealing means.

5. A coupling sleeve as claimed in claims 1, 2 or 3 characterized in that each of the levers pivots about a point which is fixed relative to the insertion end and in the end position the levers are essentially perpendicular to the wall of the insertion end.

6. A coupling sleeve as claimed in claims 1, 2 or 3 in which each of the levers pivots about a point which is fixed relative to the stop part and in the end position is essentially perpendicular to the wall of the insertion end.

* * * * *